(12) United States Patent
Tamura

(10) Patent No.: US 8,339,104 B2
(45) Date of Patent: Dec. 25, 2012

(54) BATTERY SYSTEM FOR VEHICLE

(75) Inventor: Hiroshi Tamura, Nagoya (JP)

(73) Assignee: Denso Corporation, Kariya (JP)

( * ) Notice: Subject to any disclaimer, the term of this patent is extended or adjusted under 35 U.S.C. 154(b) by 476 days.

(21) Appl. No.: 12/766,059

(22) Filed: Apr. 23, 2010

(65) Prior Publication Data
US 2010/0270976 A1    Oct. 28, 2010

(30) Foreign Application Priority Data
Apr. 23, 2009   (JP) .................................. 2009-105632

(51) Int. Cl.
*H02J 7/00*   (2006.01)
(52) U.S. Cl. ........................................ 320/136; 320/130
(58) Field of Classification Search .................... 320/136
See application file for complete search history.

(56) References Cited

U.S. PATENT DOCUMENTS

| | | | | |
|---|---|---|---|---|
| 5,778,997 A * | 7/1998 | Setaka et al. | ............. | 180/65.245 |
| 7,358,701 B2 * | 4/2008 | Field et al. | .................... | 320/104 |
| 2007/0139013 A1 * | 6/2007 | Seo et al. | ....................... | 320/130 |
| 2009/0078400 A1 | 3/2009 | Tamura et al. | | |
| 2009/0251103 A1 * | 10/2009 | Yamamoto et al. | ........... | 320/133 |

FOREIGN PATENT DOCUMENTS

| | | |
|---|---|---|
| JP | 6-24238 | 2/1994 |
| JP | 11-26032 | 1/1999 |
| JP | 2004-207108 | 7/2004 |
| JP | 2005-353327 | 12/2005 |
| JP | 2006-6073 | 1/2006 |
| JP | 2007-12568 | 1/2007 |
| JP | 2007-141660 | 6/2007 |
| JP | 2008-52997 | 3/2008 |

* cited by examiner

*Primary Examiner* — Arun Williams
(74) *Attorney, Agent, or Firm* — Nixon & Vanderhye PC

(57) ABSTRACT

A battery system for a vehicle warms up a battery, which is mounted to charge and discharge. A charge/discharge unit is located closer to a battery set than an inverter unit is. When the battery set cannot produce a required output power because of its low temperature, a control unit controls the charge/discharge unit to charge and discharge and also controls a blower to deliver heat transfer medium, which receives heat generated from the charge/discharge unit, to the battery set, so that the battery set is warmed up to produce the required output power at earlier time.

9 Claims, 6 Drawing Sheets

BATTERY SYSTEM FOR VEHICLE

CROSS REFERENCE TO RELATED APPLICATION

This application is based on and incorporates herein by reference Japanese patent application No. 2009-105632 filed on Apr. 23, 2009.

FIELD OF THE INVENTION

The present invention relates to a battery system, which has a warm-up function for raising temperature of a battery set.

BACKGROUND OF THE INVENTION

A battery system for warming up a battery is proposed by, for example, JP 2006-6073A. This conventional system has a boost converter unit, which converts a voltage level of charging and discharging a battery, so that a ripple current flowing in and out the battery is increased when the temperature of the battery is in a low temperature range lower than a predetermined reference temperature. When the ripple current flows in and out the battery, the electric power consumed by an internal resistance of the battery is increased and hence the battery temperature is raised quickly. When the battery temperature is thus increased, the internal resistance is lowered and hence the output power of the battery is suppressed from decreasing under low temperatures.

According to the conventional system, when charge and discharge of the battery are performed by the input and output of the ripple current relative to the battery at high frequencies between the battery and the boost converter unit, various components, for example, electric wires and the boost converter unit, other than the battery will also radiate heat of Joule heat. The heat radiated by such components is wasted externally without being recovered. Thus, the heat is not efficiently used within the system.

SUMMARY OF THE INVENTION

It is therefore an object of the present invention to provide a battery system, which efficiently warms up a battery by using heat radiated from devices operating to charge and discharge the battery.

According to the present invention, a battery system for a vehicle has a battery set including a plurality of battery cells, a charge/discharge unit, an inverter unit, a converter heat exchanger, a transfer unit and a control unit. The charge/discharge unit is connected to the battery set through electric wires and performs a ripple charge/discharge operation to alternately charge and discharge the battery set a plurality of times per unit time, thereby to boost a DC voltage of the battery set. The inverter unit is connected to the charge/discharge unit through electric wires and converts the boosted DC voltage outputted from the charge/discharge unit to an AC voltage thereby to supply a drive voltage to a drive motor, which drives drive wheels of the vehicle. The converter heat exchanger is provided to exchange heat generated by the charge/discharge unit with heat transfer medium. The transfer unit is provided to transfer the heat transfer medium toward the battery set. The control unit is configured to control the charge/discharge unit, the inverter unit and the transfer unit in accordance with conditions of the battery set.

The charge/discharge unit is located closer to the battery set than the inverter unit is. When the control unit determines that the battery set is incapable of supplying a predetermined electric power due to a low temperature condition of the battery set, the control unit controls the charge/discharge unit to perform the ripple charge/discharge operation and controls the transfer unit to transfer the heat transfer medium from the converter heat exchanger to the battery set after receiving the heat generated by the charge/discharge unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
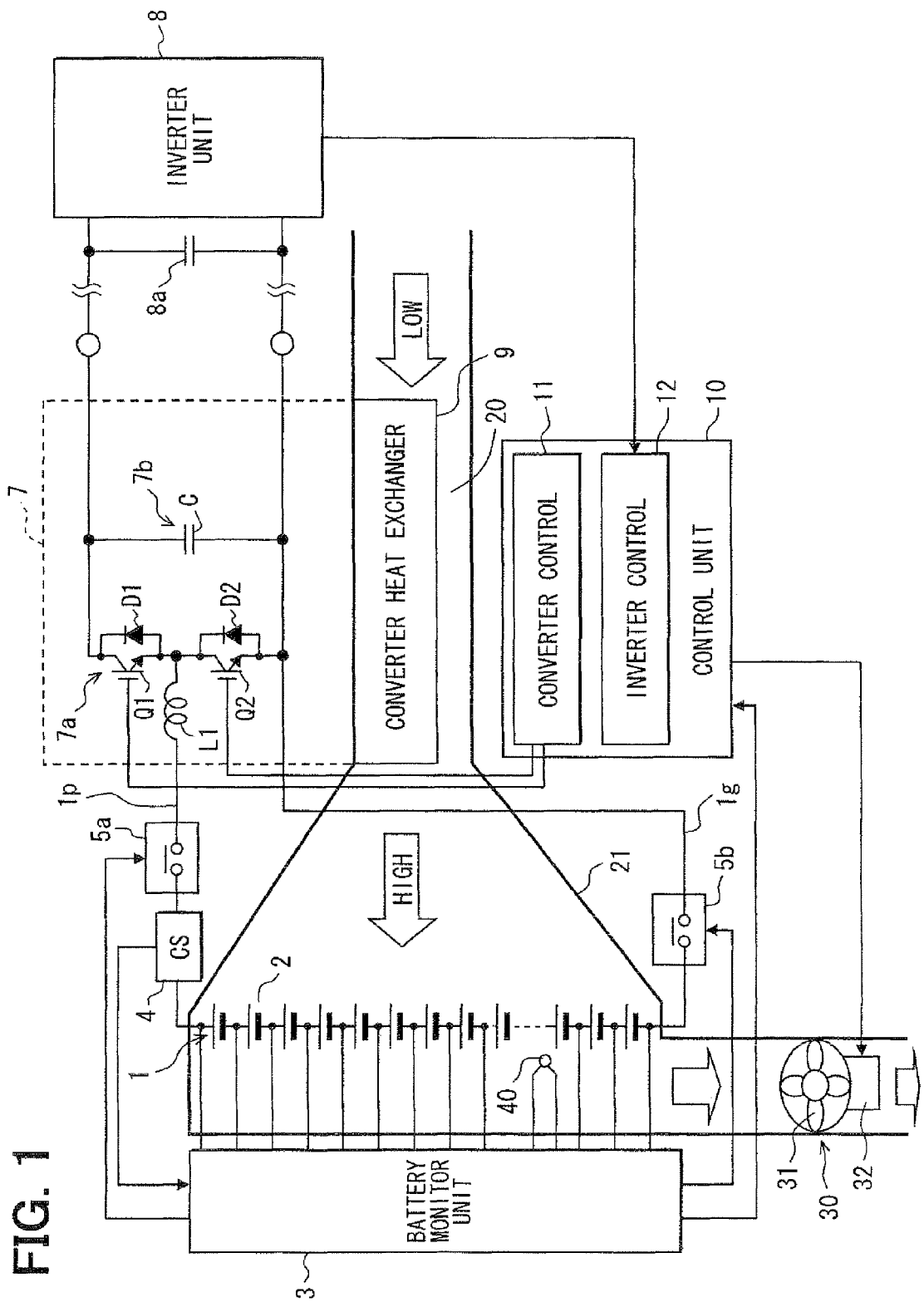
FIG. 1 is a schematic diagram of a battery system for a vehicle according to the first embodiment, the battery system being shown as warming up a battery set.

The present invention will be described in detail with reference to a plurality of embodiments shown in the accompanying drawings, in which the same reference numerals are used to denote the same or similar components or parts throughout the embodiments.

First Embodiment

Figure 2:
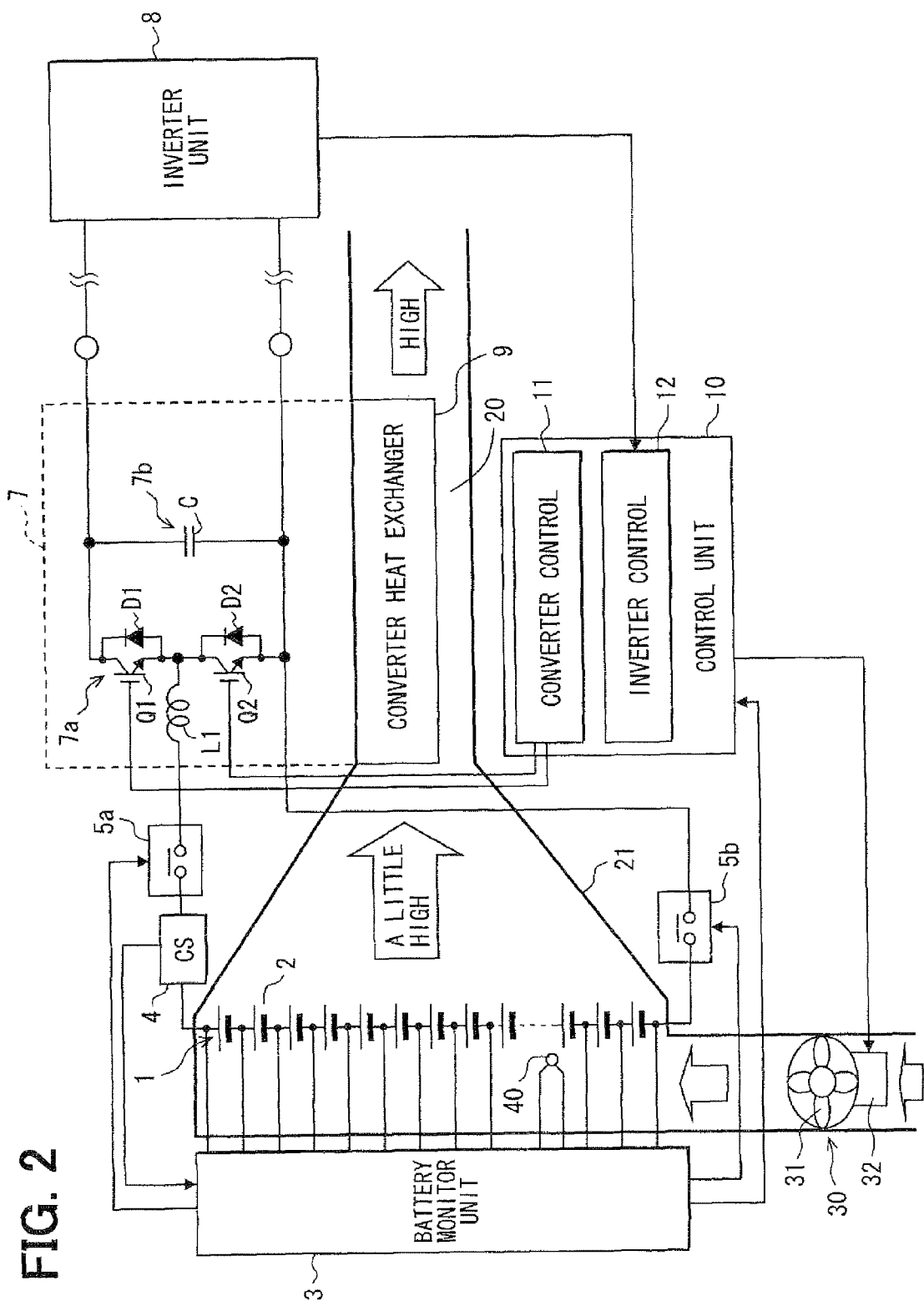
FIG. 2 is a schematic diagram of the battery system according to the first embodiment, the battery system being shown as cooling down the battery set.
Figure 3:
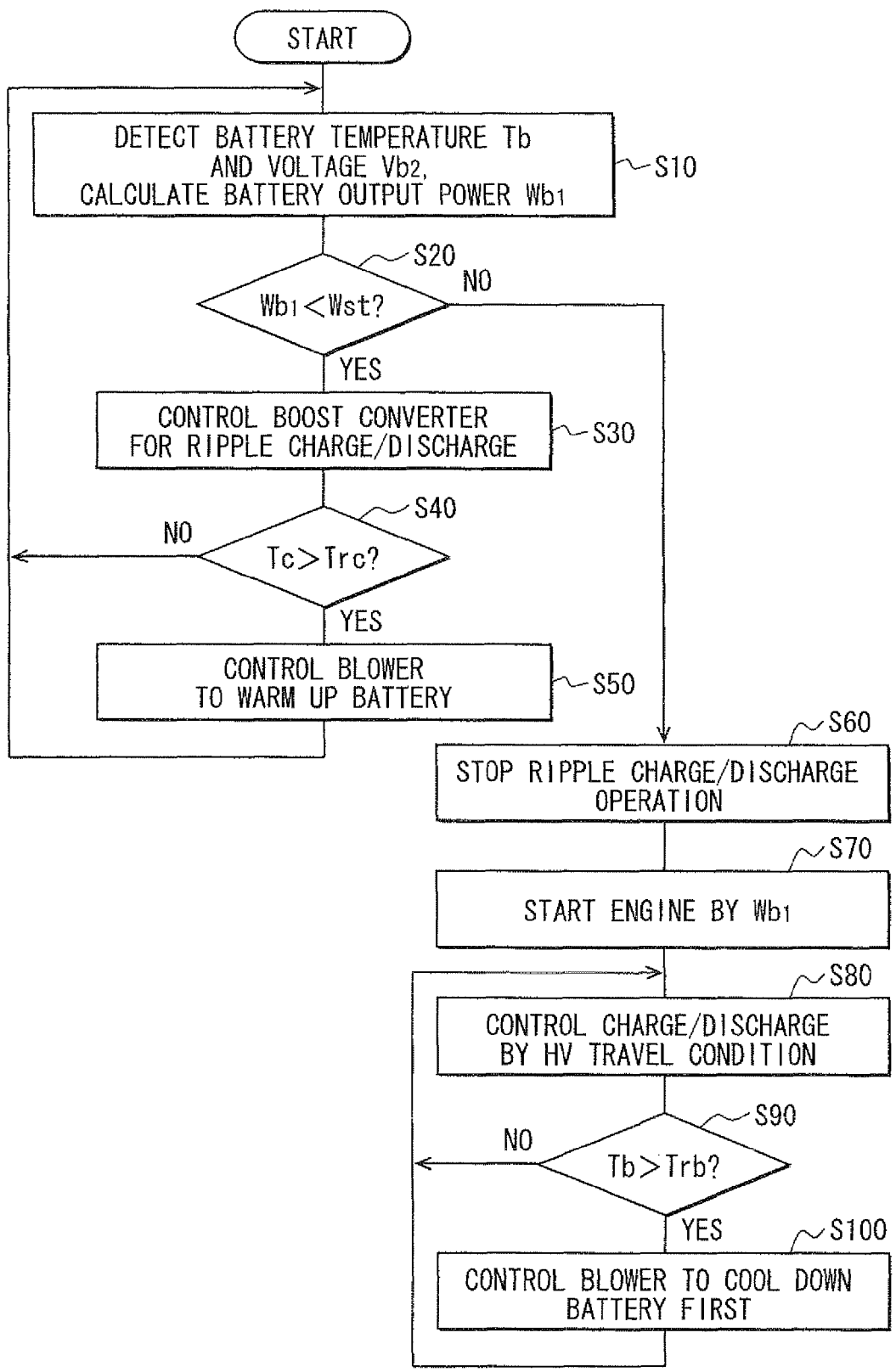
FIG. 3 is a flowchart showing control processing executed by a control unit in the first embodiment.

A battery system according to the first embodiment shown in FIGS. 1 to 3 is used in a hybrid vehicle or an electric vehicle, for example. The hybrid vehicle uses an internal combustion engine and an electric motor, which is driven by electric power charged in a battery, as a drive power source. The electric vehicle uses only an electric motor, which is driven by electric power charged in a battery, as a drive power source.

Referring to FIG. 1, a battery system is shown in an operation condition for warming up a battery set. This battery system is mounted on a vehicle to warm up and cool down the battery set, which charges and discharges electric power.

The battery system includes a battery set 1, a charge/discharge unit 7 including a boot converter 7a, an inverter unit 8, a converter heat exchanger 9, a blower 30 and an electronic control unit 10. The charge/discharge unit 7 is configured to charge and discharge ripple currents to and from the battery set 1. The inverter unit 8 is configured to convert the direct current (DC) voltage outputted from the battery set 1 into an alternating current (AC) voltage to drive an electric motor (not shown). The converter heat exchanger 9 is provided to exchange heat between the charge/discharge unit 7 and heat transfer medium. The blower 30 is provided to deliver air, which is the heat transfer medium, toward the battery set 1. The control unit 10 is configured to receive conditions of the battery set 1 and control operations of the charge/discharge unit 7, the inverter unit 8 and the blower 30.

The battery set 1, which supplies electric power to the drive motor (not shown), that is, a drive power source of a vehicle, is positioned within a vehicle compartment (other than an engine compartment), for example. The battery set 1 may be a nickel-hydrogen secondary battery, a lithium-ion secondary battery, an organic radical battery or the like. The battery set 1 is configured as an aggregate or set of a number of battery cells 2 connected in series. The battery set 1 has its internal resistance. The battery set 1 is chargeable and dischargeable by the charge/discharge unit 7 and temperature-controllable by the control unit 10. A battery monitor unit 3 is provided to monitor a voltage Vb outputted from the battery set 1 and output the detected voltage Vb to the control unit 10.

The battery set 1 is located within a space partitioned separately from a space, in which the inverter unit 8 is located. The battery set 1 is accommodated within a casing and may be located, for example, under passenger seats, between rear seats and a luggage space or between a driver seat and a front passenger seat in the vehicle. The battery set 1 may be combined into a single battery pack with the blower 30, which forcibly blows air toward the battery set 1, and mounted in the vehicle.

The drive motor is provided to generate torque for driving drive wheels of a hybrid vehicle or an electric vehicle. The drive motor also has a function of an electric power generator driven by an engine and operates as the motor relative to the engine.

The charge/discharge unit 7 includes the boost converter 7a and a capacitor 7b and is electrically connected to the battery set 1 by electric wires (power wire 1p and ground wire 1g). The charge/discharge unit 7 is configured to repeat ripple charge and discharge a number of times per second to and from the battery set 1. The charge/discharge unit 7 generates heat in performing the ripple charge/discharge operation. This heat is exchanged with heat transfer medium (air) flowing in an air passage 20 in the converter heat exchanger 9, which operates as a first heat exchange unit, so that the heat is radiated to the heat transfer medium.

The air passage 20 is formed and partitioned within a duct 21, which is integrally assembled to the battery set 1 into a single body, to allow air forcibly blown by the blower 30 to flow. Both the converter heat exchanger 9 and the battery set 1 are located within the air passage 20. The converter heat exchanger 9 has, for example, fins and air passages in contact with the fins. The fins are configured to receive heat of the charge/discharge unit 7.

The charge/discharge unit 7 is located at a position, which is closer to the battery set 1 than the position of the inverter unit 8 is, so that the electric wires 1p, 1g connecting the charge/discharge unit 7 to the battery set 1 are shorter than those connecting the inverter unit 8 to the battery set 1. The charge/discharge unit 7 is preferably located adjacent to the battery set 1 so that the wires 1p, 1g connecting to the battery set 1 are shortened as much as possible.

The charge/discharge unit 7 is accommodated inside the same space as the battery set 1 but outside the space, in which the inverter unit 8 is accommodated. For example, the charge/discharge unit 7 is located under the passenger seats, inside the space between the rear seats and the luggage compartment or inside the space between the driver seat and the front passenger seat of the vehicle, in which the temperature is relatively low. The inverter unit 8 is located in a space such as an engine compartment, in which the temperature environment is more harsh that in the space of the charge/discharge unit 7.

The inverter unit 8 is configured to convert the DC voltage outputted (discharged) from the battery set 1 and boosted by the charge/discharge unit 7 into the AC voltage to supply the drive motor with the drive voltage for driving the drive wheels of the vehicle. The inverter unit 8 is configured to convert, when the DC voltage is supplied from the charge/discharge unit 7, the DC voltage into the AC voltage in accordance with a pulse width-modulated (PWM) signal produced by the control unit 10 for driving the drive motor. The drive motor is thus driven to generate torque as required by a torque command value. The inverter unit 8 is also configured to convert an AC voltage, which is generated by the drive motor at the time of regenerative braking operation of the hybrid vehicle or the electric vehicle into a DC voltage in accordance with a PWM signal produced by the control unit 10. The DC voltage thus produced is supplied to the boost converter 7a through the capacitor 7b. The regenerative braking operation includes a braking operation, in which regenerative electric power is generated at the time of foot-braking of a driver, as well as a braking operation, in which regenerative electric power is generated at the time of deceleration of the vehicle caused by releasing an accelerator pedal to a free state and without the foot-braking.

The boost converter 7a includes a reactor L1, insulated-gate bipolar transistors (IGBTs) Q1, Q2, and diodes D1, D2. The IGBTs Q1, Q2, and the diodes D1, D2 are switching elements, which turn on and off a part of an electric circuit for converting and regulating electric power. One end of the reactor L1 is connected to the power wire 1p connecting to the battery set 1 and the other end of the same is connected to a junction between the IGBTs Q1, Q2. The IGBTs Q1, Q2 are connected in series between the power wire 1p and the ground wire. The collector of the IGBT Q1 is connected to the power wire 1p and the emitter of the IGBT Q2 is connected to the ground wire 1g. The diodes D1, D2 are connected between the collector and the emitter of the IGBTs Q1, Q2 to allow currents to flow from the emitter side to the collector side, respectively.

The capacitor 7b, which may be an aluminum electrolytic capacitor of large capacitance, is provided to smooth a DC current outputted from the battery set 1 and output the smoothed DC current to the boost converter 7a. The capacitor 7b has an equivalent series resistance.

The boost converter 7a is configured to boost the DC voltage supplied from the battery set 1 and supplies the boosted DC voltage to a capacitor 8a provided at the inverter unit 8 side. The boost converter 7a is configured to boost the DC voltage supplied from the battery set 1 in accordance with the period, in which the IGBT Q2 is turned on by a gate drive signal, and supply the boosted voltage to the capacitor 8a, when the gate drive signal is applied from the control unit 10. The boost converter 7a is also configured to lower the DC voltage supplied from the inverter unit 8 through the capacitor 8a and thereby charge the battery set 1, when the gate drive signal is applied from the control unit 10. The capacitor 8a smoothes the DC voltage supplied from the boost converter 7a and supplies the smoothed DC voltage to the inverter unit 8.

A relay device 5a and a current sensor 4 are provided in the power wire 1p, which is between the reactor L1 of the boost converter 7a and the battery set 1. The relay device 5a is provided as a control relay, which controls the supply of power from the battery set 1. A relay device 5b is provided in the ground wire 1g, which is between the battery set 1 and the emitter side of the IGBT Q2 of the boost converter 7a. The relay device 5b in the ground wire 1g is provided as a system main relay, which is capable of connecting and disconnecting the main current path on the low voltage side. The relay device 5a in the power wire 1p is provided as a system main relay, which is capable of connecting and disconnecting the main current path on the high voltage side. The relay devices 5a, 5b are both controllable by the battery monitor unit 3 to supply and interrupt the current for the battery set 1. The relay devices 5a, 5b are configured to be turned on and off synchronously to close and open the electric connection path between the battery set 1 and electric loads. The current sensor 4 is provided to detect a current, which flows in the battery set 1, and output a current signal indicative of the detected current to the battery monitor unit 3 as a charge current or a discharge current.

The battery monitor unit 3 is configured to receive detection output signals from various sensors for monitoring the operation conditions of each battery cell 2 of the battery set 1. The battery monitor unit 3 includes a high voltage battery signal detection section and a low voltage battery signal detection section. The high voltage battery signal detection section receives various information indicative of temperature of the battery cells 2 detected by a temperature sensor 40, current detected by the current sensor 4, and voltage, internal resistance, ambient temperature and the like of the battery set 1. The low voltage battery signal detection section receives various information indicative of temperature, current, voltage, internal resistance, ambient temperature and the like of an auxiliary battery (accessory device and not shown).

The blower 30 blows air, which is heat transfer medium, toward the battery set 1. Specifically the blower 30 is controlled by the control unit 10 to draw the air in a passenger compartment into the air passage 20 and deliver it to the battery set 1. The blower 30 thus operates as a transfer unit. The blower 30 is configured to be able to switch the direction of blow of air between two directions so that the air may be blown in two different directions in the air passage 20, that is, from the battery set 1 toward the converter heat exchanger 9 and from the converter heat exchanger 9 to the battery set 1. Thus, the blower 30 cools down or warms up the battery set 1 by blowing unheated air of the passenger compartment or warm air having heat generated by the charge/discharge unit 7.

The blower 30 includes an axial fan 31 and an electric motor 32, which drives the axial fan 31 to rotate, and is provided inside the duct 21 forming the air passage 20. The blower 30 is not limited to a particular type but may be any other types as far as the direction of air can be blown in forward and reverse directions. For example, it may be a diagonal-type fan or a centrifugal-type fan (sirocco fan, radial fan, turbo fan and the like). The air blown into the air passage 20 by the blower 30 flows along outer surfaces of the battery cells 2 forming the battery set 1 thus contacting the battery cells 2 from the external side.

Figure 6:
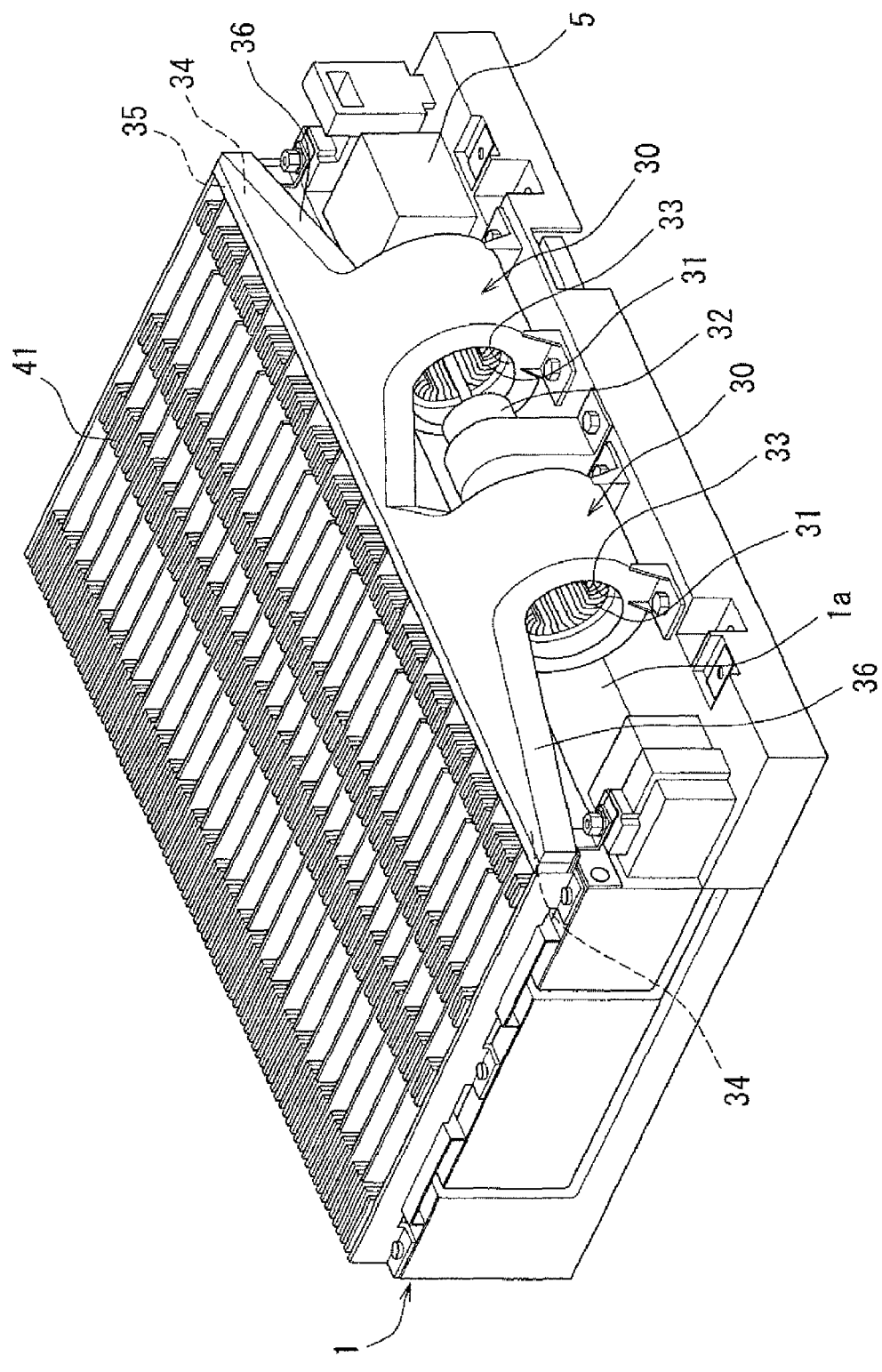
FIG. 6 is a perspective view of an example of a blower and a battery set, which are contiguously integrated.

The air blown into the air passage 20 by the blower 30 flows toward the upper surface of the battery set 1 and reaches the upper surface of each of the battery cells 2. It is possible as shown in FIG. 6 to provide a plurality of fins 41 on the upper side of the battery set 1. The fins 41 may be formed integrally with a bus bar (not shown), which connects electrodes of the battery cells 2. In this instance, the air flowing in the air passage 20 contacts fins 41 so that the air exchanges heat with the battery cells 2 through the fins 41. By the exchange of heat with the air, the battery cells 2 are warmed up or cooled down.

The control unit 10 is configured to receive signals indicative of various conditions of the battery set 1 detected by the battery monitor unit 3 and control operations of the charge/discharge unit 7, the inverter unit 8 and the blower 30. The control unit 10 may be a part of a hybrid vehicle electronic control unit (ECU), which electronically controls the operation of a hybrid vehicle. The control unit 10 includes a boost converter control section 11 and an inverter control section 12. The inverter control section 12 generates a PWM signal based on a motor current, a torque command value and an output voltage Vm of the boost converter 7a and outputs the PWM signal to the inverter unit 8 thereby to drive the inverter unit 8. The control unit 10 is configured to become operative with the electric power of the auxiliary battery supplied when an ignition switch (not shown) is turned on. The control unit 10 is further configured to communicate with various electronic control units (for example, hybrid ECU) of the vehicle through communications wires connected to a communications connector.

The boost converter control section 11 is configured to generate gate drive signals for feedback-controlling the boost converter 7a based on the motor rotation speed, the torque command value and the voltages Vb and Vm in driving the drive motor and output the gate drive signals to the IGBTs Q1, Q2 of the boost converter 7a.

The gate drive signals are generated to raise the DC voltage Vb supplied from the battery set 1 so that the output voltage Vm attains the voltage command value or to lower the DC voltage supplied from the inverter unit 8. The boost converter 7a performs the voltage raising and lowering operation in accordance with the gate drive signals. The boost converter 7a thus operates as a two-way converter.

The boost converter control section 11 is configured to control the charge/discharge unit 7 to charge and discharge the battery set 1 by applying and receiving voltages including ripple components (AC components) to and from the battery set 1, respectively, in the voltage raising and lowering operation corresponding to the gate drive signals. The boost converter control section 11 thus controls the boost converter 7a to repeat ripple charge and discharge of the battery set 1 alternately in a short period of time. According to this ripple charge and discharge operation, the temperature of the battery set 1 is raised speedily and the internal resistance of the battery set 1 is decreased. Thus, the output power of the battery set 1 is suppressed from decreasing. In this ripple charge and discharge operation, the output voltage of the battery set 1 fluctuates in a ripple waveform relative to the electromotive force (voltage) of the battery set 1 due to a number of repetition of alternate charge and discharge within the short period of time. In the ripple charge and discharge operation, the current also fluctuates in the positive direction and the negative direction in an AC current waveform. The ripple charge and discharge is repeated at high frequencies, which is in the range of 100 Hz to 2000 Hz, for example.

The control unit 10 is configured to generate a PWM signal for converting the AC voltage generated by the drive motor into the DC voltage and apply the PWM signal to the inverter unit 8, when the hybrid vehicle or the electric vehicle is in the regenerative braking operation mode. In this case, IGBTs of the inverter unit 8 are controlled to switch over respective on-off conditions by the PWM signal. The inverter unit 8 thus converts the AC voltage generated by the drive motor into the DC voltage and supplies the DC voltage to the boost converter 7a. The control unit 10 is further configured to generate gate drive signals for lowering the DC voltage supplied from the inverter unit 8 and apply the gate drive signals to the boost converter 7a, when the hybrid vehicle or the like is in the regenerative braking operation mode. The AC voltage generated by the drive motor is thus converted into the DC voltage, which is lowered in magnitude and supplied to the battery set 1 to charge the battery set 1.

The control unit 10 is configured to control the operation of the charge/discharge unit 7 for performing the ripple charge/discharge operation and control the operation of the blower 30 to transfer the air (heat transfer medium) in the air passage 20, which received the heat generated by the charge/discharge unit 7, to the battery set 1, when it determines that a predetermined electric power cannot be supplied because of a low temperature condition of the battery set 1. The control unit 10 is configured to control the charge/discharge unit 7 to perform the ripple charge/discharge and control the blower 30 so that the battery set 1 may be warmed up from both its inside by utilizing Joule heat and its outside by utilizing the warmed air (warm air) from the converter heat exchanger 9, when a warm-up of the battery set 1 is required.

The control unit 10 is configured to control the blower 30 to transfer air in the air duct 20 toward the converter heat exchanger 9 after passing and cooling down the battery set 1 as shown in FIG. 2, when it determines that the battery set 1 need be cooled down because of a high temperature condition of the set. That is, the control unit 10 is configured to control the blower 30 to reverse the direction of transfer of the air from that of the warm-up case shown in FIG. 1, when a cool-down of the battery set 1 is required. Thus, relatively low temperature air, which is introduced from the passenger compartment into the air passage 20 for example, is blown to the battery set 1 by the blower fan 30 to cool down the battery set 1. This air is a little warmed up by the heat radiated from the battery set 1 and flows toward the converter heat exchanger 9, where the air is further heated by the heat of the converter heat exchanger 9 before finally being discharged to the external side.

The operation of the battery system according to the first embodiment will be described with reference to control processing, which the control unit 10 is programmed to perform.

When the control unit 10 is powered by the turn-on of the ignition switch, for example, the control unit 10 detects the battery temperature Tb, the battery voltage Vb2 and the like inputted from the battery monitor unit 3 and calculates the output power Wb1 of the battery set 1 by its calculation program (step(S) 10).

The control unit 10 then checks whether the calculated battery output power Wb1 is lower than a predetermined power Wst (engine start power) required to start an engine of the vehicle (S20). This check at S20 is one example of checking whether a requirement for warm-up of the battery set 1 has been satisfied, that is, whether the battery set 1 has already been warmed up.

If the battery power Wb1 is lower than the engine start power Wst (S20: YES), the control unit 10 determines that the warm-up of the battery set 1 is necessary and performs the processing for the ripple charge/discharge operation (charge/discharge by high frequency AC signal) (S30). Specifically, the boost converter control section 11 of the control unit 10 controls the boost converter 7a to perform the ripple charge/discharge operation with the battery set 1. Further, the inverter control section 12 controls the inverter unit 8 in correspondence to the ripple charge/discharge control operation. By the ripple charge/discharge operation, the temperature of the battery set 1 is raised quickly. As a result, the internal resistance of each battery cell 2 is decreased and the output power of the battery set 1 is improved.

While performing the ripple charge/discharge operation, the control unit 10 checks whether the fin temperature Tc of the converter heat exchanger 9 is higher than a predetermined reference temperature Trc (S40). If the fin temperature Tc is lower than the reference temperature Trc (S40: NO), the control unit 10 performs its processing from S10 again. If the fin temperature Tc is higher than the reference temperature Trc (S40: YES), the control unit 10 determines that the converter heat exchanger 9 can sufficiently radiate heat received from the charge/discharge unit 7 into the air passage 20. The control unit 10 therefore performs the warm-up operation for warming up the battery set 1 (S50). The control unit 10 specifically controls the rotation direction and the drive voltage of the motor 32 of the blower 30 so that the warm air may be blown in the air duct 20 by the axial fan 31 in the direction shown in FIG. 1, that is, the warm air warms up the battery set 1.

After the battery temperature control by S50, the control unit 10 performs S10 again to check whether the battery power Wb1 has risen above the engine start power Wst. If the battery power Wb1 has risen above the engine start power Wst (S20: YES), the control unit 10 determines that the warm-up is not required any more. Then, the control unit 10 stops the ripple charge/discharge operation of the charge/discharge unit 7 (S60), and starts the engine by the electric power of the battery set 1 (S70). In the control unit 10, the boost converter control section 11 and the inverter control section 12 perform respective normal control programs to control the operations of the boost converter 7a and the inverter unit 8 so that the battery set 1 is charged and discharged by the DC signal in accordance with the travel condition of the hybrid vehicle (S80).

While controlling the converter unit 7 and the inverter unit 8 (S80), the control unit 10 checks whether the battery temperature Tb inputted from the battery monitor unit 3 is higher than a predetermined reference temperature Trb (S90). If the battery temperature Tb is lower than the reference temperature Trb (S90: N), the control unit 10 returns its processing to S80. If the battery temperature Tb is higher than the reference temperature Trb (S90: YES), the control unit 10 determines that the battery set 1 is required to be cooled down. The control unit 10 therefore performs cool-down control for the battery set 1 so that the battery temperature Tb may be regulated in a predetermined temperature range (appropriate temperature range), in which each of the battery cells 2 can operate with high efficiency (S100). The control unit 10 specifically controls the rotation direction and the drive voltage of the motor 32 of the blower 30 so that air of relatively low temperature may be blown in the air duct 20 by the axial fan 31 in the direction shown in FIG. 2, that is, the blown air cools down the battery set 1 first and then the boost converter 7a.

While the vehicle is in travel, the control unit 10 repeats S80, S90 and S100. If the vehicle is stopped by turning off the ignition switch, the control unit 10 terminates the processing of FIG. 3 until the power supply is started again.

The battery system according to the first embodiment provides the following functions and advantages.

When the battery set 1 is in such a condition that it cannot supply a required power (engine start power Wst), the charge/discharge unit 7 performs the ripple charge/discharge operation to warm up each battery cell 2 by Joule heat from the inside and the heat radiated from the charge/discharge unit 7 is transferred by the air passing the converter heat exchanger 9 in the air duct 20 to warm up the battery set 1 from the outside. Thus, the battery set 1 is warmed up efficiently from both sides.

Since the charge/discharge unit 7 is closer to the battery set 1 than the set 8 is, the wires 1p, 1g connecting the charge/discharge unit 7 and the set are shortened and hence the amount of heat generated by such wires can be decreased. Thus, electric energy stored in the battery can be used effectively by reducing waste of energy caused by heat radiation in the wires 1p, 1g.

In addition, the charge/discharge unit 7 is necessarily provided in the HV vehicle or the electric vehicle for driving the electric motor, its heat energy can be utilized efficiently without adding new heat source and the like.

When the battery set 1 is in such a condition that it should be cooled down, relatively cool air is supplied first to the battery set 1 in the direction opposite to the direction for warming up the battery set 1 by the blower 30. As a result, the temperature of the battery set 1 can be controlled in an appropriate range, the reduction in battery function in both charge operation and discharge operation of the battery can be suppressed. For example, insufficeincy of current or voltage at the time of discharging as well as excessive voltage at the time of charging are suppressed. The battery is suppressed from being damaged.

The charge/discharge unit 7 is preferably located adjacent to the battery set 1 so that the path for transferring the heat of the charge/discharge unit 7 to the battery set 1 is shortened and the radiation of heat from the air in the air passage 20 before arriving at the battery set 1 can be reduced. In this case, the heat radiation from the wires 1p, 1g can also be reduced because of reduction in the length of the wires 1p, 1g. Thus, the battery warm-up efficiency can be further increased.

It is preferred that the battery set 1 and the inverter unit 8 are located in separate partitioned spaces in the vehicle and the battery set 1 and the charge/discharge unit 7 are located in the same partitioned space. For example, the charge/discharge unit 7 and the battery set 1 are located in the peripheral part in the passenger compartment, the luggage compartment, or the like, which is other than the engine compartment and in a relatively low air temperature condition. The inverter unit 8 is located in the engine compartment or its nearby location, which is relatively in a high air temperature condition.

As far as the charge/discharge unit 7 and the battery set 1 are close to each other in the same temperature environment, it is highly possible to supply warmed air in a predetermined temperature range efficiently to the battery set 1.

The air passage 20 is formed within the duct 21, which is integrated with the battery set 1 into a single unit, and the converter heat exchanger 9 is located inside the duct 21. As a result, the battery set 1 and the exchanger 9 are integrated to each other by the duct 21. It is also possible to integrate the battery set 1 and the charge/discharge unit 7 by the duct 21, so that the battery system may be sized compact to be easily mounted in the vehicle.

Each of the battery cells 2 of the battery set 1 is preferably a lithium-ion battery. Although the lithium-ion battery cannot produce high power under low temperature conditions, such a low output power problem can be easily obviated.

As shown in FIG. 6, the blower 30 may be provided as a transfer unit adjacently to one side surface 1a of the rectangular parallelpiped shape of the battery set 1, and integrated with the battery set 1. The blower 30 has an inlet 33 for taking in air in the direction parallel to the side surface 1a of the unit 1 and an outlet 35 for discharging the air therefrom. The blower 30 also has a casing 36, which forms a passage 34 therein gradually expanding toward the outlet 35 in the direction of flow of air.

According to this configuration, the casing 36 defines therein a passage 34, which is broadened to the end, the size of the blower 30 is reduced in width from the outlet 35 to the inlet 33. As a result, a space can be provided at the side of the inlet 33 of the blower 30. That is, the space, which is adjacent to the side surface 1a of the battery set 1 and is occupied by the blower 30, can be reduced and hence a large space, which is not occupied by the blower 30, can be provided. In this space, which is normally a dead space, various electronic devices such as the charge/discharge unit 7, the blower 3, the current sensor 4, the relay devices 5 (5a, 5b), can be efficiently disposed. The battery system can thus be sized compact.

Second Embodiment

Figure 4:
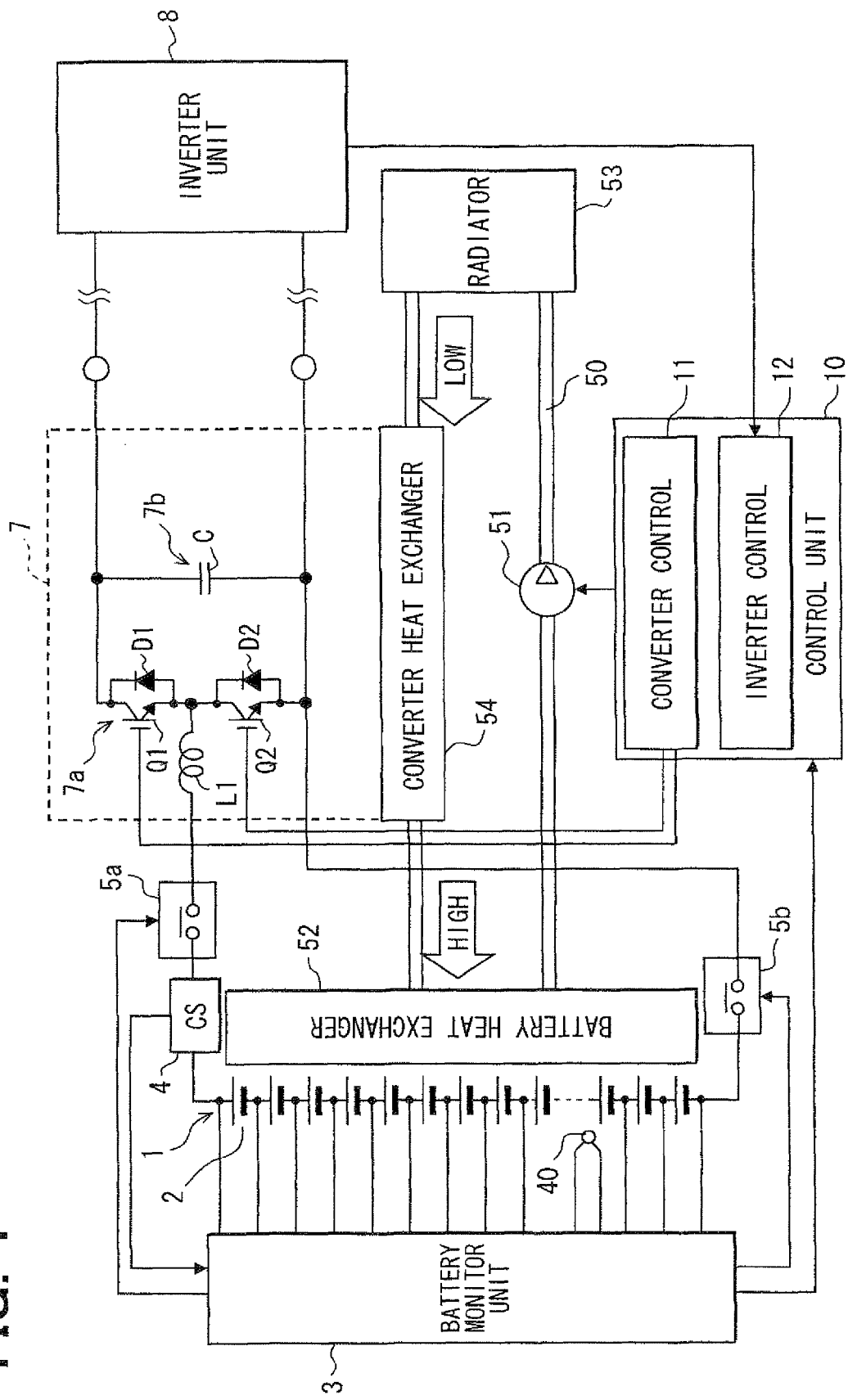
FIG. 4 is a schematic diagram of a battery system for a vehicle according to the second embodiment, the battery system being shown as warming up a battery set.
Figure 5:
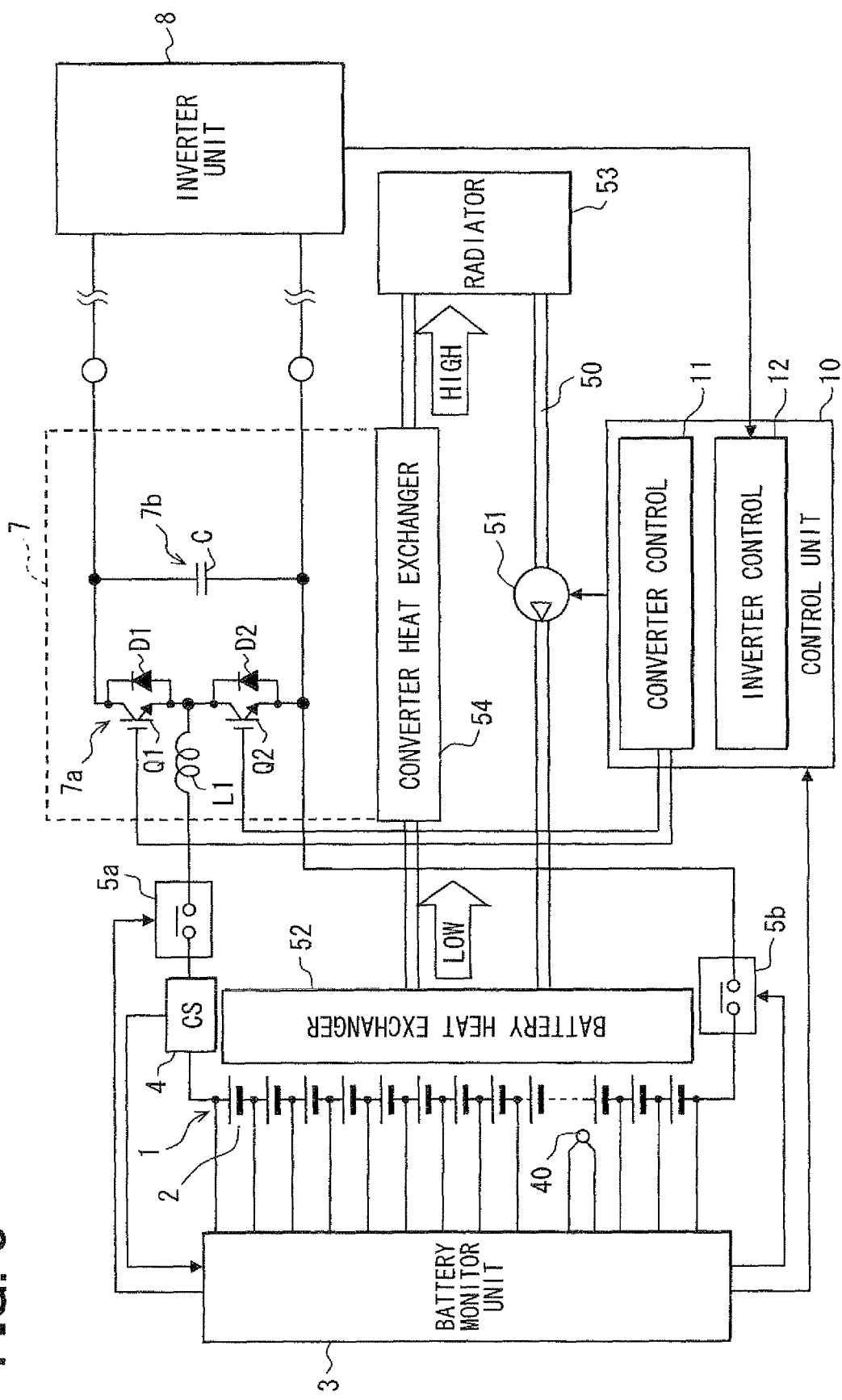
FIG. 5 is a schematic diagram of the battery system according to the second embodiment, the battery system being shown as cooling down the battery set.

A battery system according to the second embodiment shown in FIGS. 4 and 5 is different from the first embodiment in that liquid refrigerant such as water is used as the heat transfer medium to control the temperature of the battery set 1 by the liquid refrigerant. The battery set 1 is provided in a refrigerant circulation circuit 50 so that the refrigerant flowing in the circulation circuit 50 exchanges heat with the battery set 1. The circulation circuit 50 includes therein a pump 51, a battery heat exchanger 52, a radiator 53 and a converter heat exchanger 54.

In the second embodiment, the battery fins 41 are provided on the battery set 1 as shown in FIG. 6 as a heat transfer part of the battery set 1 to transfer heat to and from the battery cells 2. The battery heat exchanger 52 is provided to exchange heat with the fins 41 of the battery set 1 by the refrigerant. Further, the radiator 53 is provided as a second heat exchanger to radiate the heat of the refrigerant to the outside. The pump 51 is provided as the transfer unit in the circulation circuit 50 to forcibly circulate the refrigerant in the circulation circuit 50. The pump 51 is configured to be capable of switch over the discharge direction in two opposite directions, that is, in the clockwise direction and the counter-clockwise direction in FIGS. 4 and 5.

The pump 51 has vanes therein and driven by an electric motor (not shown). The pump 51 is configured to be capable of changing the rotation direction and the rotation speed of the vanes by the motor. The liquid discharge direction of the pump 51 between two opposite directions is controlled by reversing the rotation direction of the motor and the discharge amount is controlled by rotation speed of the motor. The motor of the pump 51 is controlled by the control unit 10. The converter heat exchanger 54 has fins (not shown) and a refrigerant passage (not shown). The fins are heat transfer part, to which heat of the charge/discharge unit 7 is transferred. The refrigerant passage forms a part of the circulation circuit 50 and contacts the fins. The battery heat exchanger 52 also has a refrigerant passage, which forms a part of the circulation circuit 50 and contacts the fins 41. The radiator 53 also has a refrigerant passage, which forms a part of the circulation circuit 50, and exchanges heat between the refrigerant flowing in the refrigerant passage and the outside air.

The battery system according to the second embodiment operates generally in the similar manner as the first embodiment. If the temperature of the battery set 1 is low, the control unit 10 determines that the battery set 1 will not be able to supply the required output power. The control unit 10 therefore controls the charge/discharge unit 7 to perform the ripple charge/discharge operation and drives the pump 51 so that the heat generated by the charge/discharge unit 7 and received by the refrigerant (water) is transferred to the battery heat exchanger 52. Specifically, when the warm-up of the battery set 1 is required or necessary, the ripple charge/discharge is performed. Further by properly controlling the refrigerant discharge direction and the rotation speed of the pump 51, the battery set 1 is heated by the Joule heat from the inside and warmed from the outside by the warmed refrigerant as shown in FIG. 4.

If the temperature of the battery set 1 is high, the control unit 10 determines that the battery set 1 will have to be cooled down. The control unit 10 therefore controls the pump 51 so that the refrigerant is supplied first to the battery set 1 to cool down the battery set 1 and then to the converter heat exchanger 54 as shown in FIG. 5. Thus, when the cool-down of the battery set 1 is required or necessary, the control unit 10 reverses the direction of rotation of the pump 51 so that the refrigerant may be discharge in the direction opposite to that of warming up the battery set 1. The refrigerant, which is at relatively low temperature, flows into the battery heat exchanger 52 to lower the temperature of the battery set 1. The refrigerant receives heat from the battery set 1 and hence warmed a little. Then the refrigerant flows into the converter heat exchanger 54, at which the temperature of the refrigerant is raised to higher temperature by the heat of the charge/ discharge unit 7. The refrigerant further flows into the radiator 53, at which the refrigerant radiates heat outside so that it is cooled down by the heat exchange with the outside air.

The battery system according to the second embodiment basically operates in the similar manner as shown in FIG. 3. However, the operation is slightly different in the following points.

If the battery power Wb1 is lower than the engine start power Wst (S20: YES) and the fin temperature Tc of the charge/discharge unit 7 becomes higher than the predetermined reference temperature Trc (S40: YES), the control unit 10 controls the rotation direction and speed of the pump 51 so that the refrigerant flows in the circulation circuit 50 in the counterclockwise direction in FIG. 4 to warm up the battery set 1 (S50).

If the battery output power Wb1 becomes higher than the engine start power Wst (S20: NO), the control unit 10 stops the ripple charge/discharge operation of the charge/discharge unit 7 (S60) and performs the charge/discharge control operation by the charge/discharge unit 7 and the inverter unit 8 in accordance with the travel condition of the HV vehicle (S80). As far as the battery temperature Tb remains lower than the reference temperature Trb (S90: NO), the control unit 10 repeats the charge/discharge control operation (S80). If the battery temperature Tb rises above the reference temperature Trb, the control unit 10 determines that the battery set 1 should be cooled down (S90: YES). The control unit 10 therefore controls the rotation direction and the rotation speed of the pump 51 to reverse the direction of flow of the refrigerant in the circulation circuit 50 to the clockwise direction as shown in FIG. 5 (S100).

Other Embodiments

The present invention is not limited to the first and second embodiments but may be implemented in different embodiments.

The low temperature condition and the high temperature condition of the battery cells 2, which indicate necessity of warming up and cooling down of the battery set 1, respectively, may be determined by using at least one of battery information of the battery cells 2, environment information of the battery cells 2 and system information of the battery system. The battery information includes temperature, voltage, current or internal resistance of the battery cells. The environment information includes environment temperature (ambient temperature) of the battery cells 2. The system information includes temperature or operation condition (for example, current or voltage) of various control devices. For example, for detecting temperature condition of the battery cells 2, not only the temperature of the battery cell itself but also any other information, which indirectly represents cell temperature, may be used so that the battery cell temperature may be detected accurately.

Various devices or units provided in the circulation circuit 50 to warm up the battery set 1 need not be located at positions shown in FIGS. 4 and 5. That is, such devices or units may be located at any positions as far as the heat of the charge/ discharge unit 7 can be transferred to the refrigerant flowing in the circulation circuit 50.

Each battery cell 2 may be arranged in the casing with a spacing relative to the adjacent one in the direction of stacking of cells. In this case, the air supplied by the blower 30 flows in the direction perpendicular to the direction of stack of cells 2. That is, the air flows through the spaces, passing along the side surfaces of adjacent two cells 2 facing each other. The air thus contacts the outside surfaces of each cell 2 and exchanges heat. The air further flows in the air passage 20 toward the outlet of the passage 20, where the air is discharged to the outside. It is of course possible to arrange the battery cells 2 in a manner to contact each other without spacing. In this case, the air flowing in the air passage 20 collides with the battery fins 41, which are thermally coupled with the electrode parts of the battery cell 2, and exchanges heat with the battery cells 2 so that the battery cells 2 are warmed up or cooled down.

The battery heat exchanger 52 is not limited to exchange heat with the battery cells 2 of the battery set 1 through the battery fins 41. For example, it may exchange heat with the battery cells 2 of the battery set 1 through other members, which are thermally coupled to the outer peripheral surfaces of the battery cells 2. In this case, the heat transferred to such other members is transferred to or from the refrigerant flowing in the circulation circuit 50.

What is claimed is:

1. A battery system for a vehicle comprising:
    a battery set including a plurality of battery cells;
    a charge/discharge unit, connected to the battery set through electric wires, for performing a ripple charge/ discharge operation to alternately charge and discharge the battery set a plurality of times per unit time, thereby to boost a DC voltage of the battery set;
    an inverter unit, connected to the charge/discharge unit through electric wires, for converting the boosted DC voltage outputted from the charge/discharge unit to an AC voltage thereby to supply a drive voltage to a drive motor, which drives drive wheels of the vehicle;
    a converter heat exchanger for exchanging heat generated by the charge/discharge unit with heat transfer medium;
    a transfer unit for transferring the heat transfer medium toward the battery set; and
    a control unit for controlling the charge/discharge unit, the inverter unit and the transfer unit in accordance with conditions of the battery set,
    wherein the charge/discharge unit is located closer to the battery set than the inverter unit is, and
    wherein, when the control unit determines that the battery set is incapable of supplying a predetermined electric power due to a low temperature condition of the battery set, the control unit controls the charge/discharge unit to perform the ripple charge/discharge operation and controls the transfer unit to transfer the heat transfer medium from the converter heat exchanger to the battery set after receiving the heat generated by the charge/ discharge unit.

2. The battery system according to claim 1, wherein:
    when the control unit determines that the battery set need be cooled down due to a high temperature condition of the battery set, the control unit controls the transfer unit to transfer the heat transfer medium to the heat exchanger from the battery set after cooling the battery set.

3. The battery system according to claim 1, wherein:
the charge/discharge unit is located adjacent to the battery set.

4. The battery system according to claim 1, wherein:
the battery set and the inverter unit are located separately in different spaces partitioned in the vehicle; and
the charge/discharge unit is located in the same space, in which the battery set is located.

5. The battery system according to claim 1, wherein:
the heat transfer medium includes air;
the transfer unit includes a blower, which is capable of transferring the air switchably in two directions; and
the converter heat exchanger and the battery set are located in an air passage, in which the air is allowed to flow.

6. The battery system according to claim 5, further comprising:
a duct integrally assembled with the battery set and defining the air passage therein.

7. The battery system according to claim 1, further comprising:
a battery heat exchanger for exchanging heat with the battery cells through a heat transfer part of the battery set by the heat transfer medium; and
a radiator for radiating heat of the heat transfer medium to an outside,
wherein the heat transfer medium includes liquid refrigerant,
wherein the transfer unit includes a pump, which is capable of discharging the liquid refrigerant switchably in two directions, and
wherein the converter heat exchanger, the battery heat exchanger and the radiator are disposed in a circulation circuit of the liquid refrigerant.

8. The battery system according to claim 1, wherein:
the charge/discharge unit includes a boost converter and a capacitor.

9. The battery system according to claim 1, wherein:
the battery cells are lithium-ion batteries.

* * * * *